(12) United States Patent
Chen et al.

(10) Patent No.: US 8,302,924 B2
(45) Date of Patent: Nov. 6, 2012

(54) DRIVE MOUNT

(75) Inventors: Xiao-Zhu Chen, Shenzhen (CN);
Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 484 days.

(21) Appl. No.: 12/577,216

(22) Filed: Oct. 12, 2009

(65) Prior Publication Data

US 2011/0068666 A1   Mar. 24, 2011

(30) Foreign Application Priority Data

Sep. 24, 2009   (CN) .......................... 2009 1 0307639

(51) Int. Cl.
*A47F 5/00* (2006.01)
(52) U.S. Cl. ................ 248/298.1; 248/274.1; 248/276.1; 248/694; 361/679.33; 361/679.37
(58) Field of Classification Search ............... 248/298.1, 248/176.3, 205.1, 220.21, 220.22, 222.52, 248/225.11, 274.1, 276.1, 309.1, 317, 323, 248/694; 361/679.33, 679.37
See application file for complete search history.

(56) References Cited

U.S. PATENT DOCUMENTS

| | | | | |
|---|---|---|---|---|
| 6,646,872 B1 * | 11/2003 | Chen | ........................ | 361/679.33 |
| 7,778,021 B2 * | 8/2010 | Zhang et al. | ............. | 361/679.33 |
| 7,796,380 B2 * | 9/2010 | Lee | ............................ | 361/679.33 |
| 7,830,656 B2 * | 11/2010 | Ding | ......................... | 361/679.37 |
| 2005/0040306 A1 * | 2/2005 | Chen et al. | .................. | 248/298.1 |

* cited by examiner

*Primary Examiner* — Ramon Ramirez
*Assistant Examiner* — Todd M Epps
(74) *Attorney, Agent, or Firm* — Altis Law Group, Inc.

(57) ABSTRACT

A drive mount includes a first mounting frame and a second mounting frame. The first mounting frame includes a bottom plate which defines a first slot and a second slot therein. The first slot and the second slot intersect and angle from each other. An entrance port is formed between the first slot and the second slot. The second mounting frame includes a top plate with a connecting tube protruding towards the first mounting frame. A free end of the connecting tube expands outwardly to form a locking portion. The connecting tube and the locking portion of the second mounting frame are received in the entrance port, and the connecting tube can selectively slip along the first slot or the second slot, with the locking portion engaging edges of the first slot or the second slot to connect the first and second mounting frames together.

10 Claims, 5 Drawing Sheets

DRIVE MOUNT

BACKGROUND

1. Technical Field

The disclosure generally relates to device mounting, and particularly to a drive mount of a computer for disk drives.

2. Description of Related Art

A computer often includes a computer case, a main board, a disk drive, and a drive mount. The main board, the hard disk drive and the drive mount are accommodated in the computer case. The disk drive can be for example, a hard disk drive or a compact disk-read only memory (CD-ROM) drive. The disk drive is mounted in the computer case in the drive mount.

With developments in technology, computer cases are designed with increasingly reduced size and volume prioritized, with inner space thereof decreasing commensurately. Distance between the drive mount and the main board is often reduced, which easily causes interferences between the disk drive and electronic components mounted on the main board.

Further, drive mount proximity to the main board complicates installation and removal of the disk drive, and electronic components of the main board near the drive mount are easily damaged during these and other operations.

Accordingly, what is needed is a drive mount which can overcome the limitations described.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
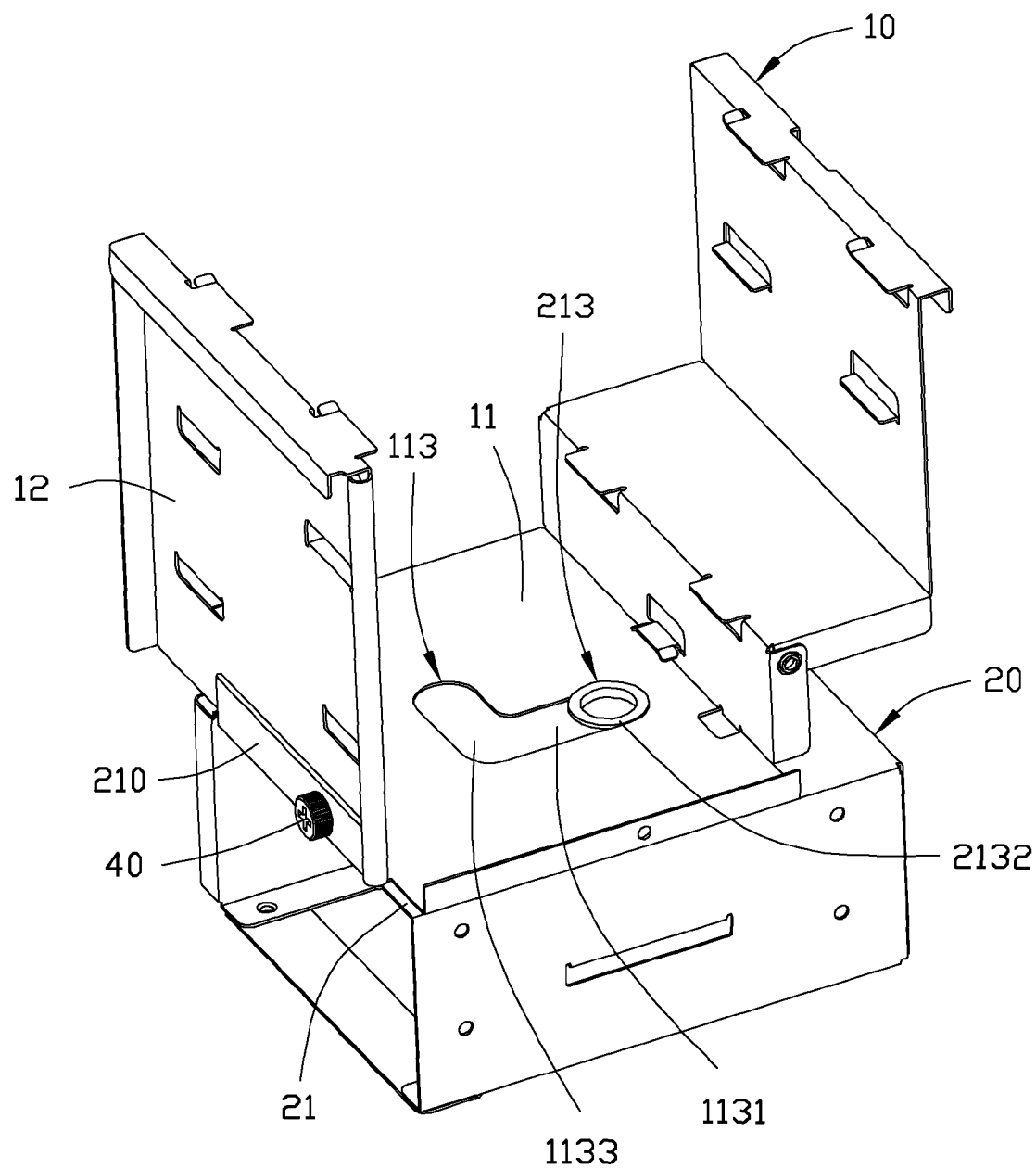
FIG. 1 is an isometric, assembled view of a drive mount in accordance with an exemplary embodiment of the present disclosure.
Figure 5:
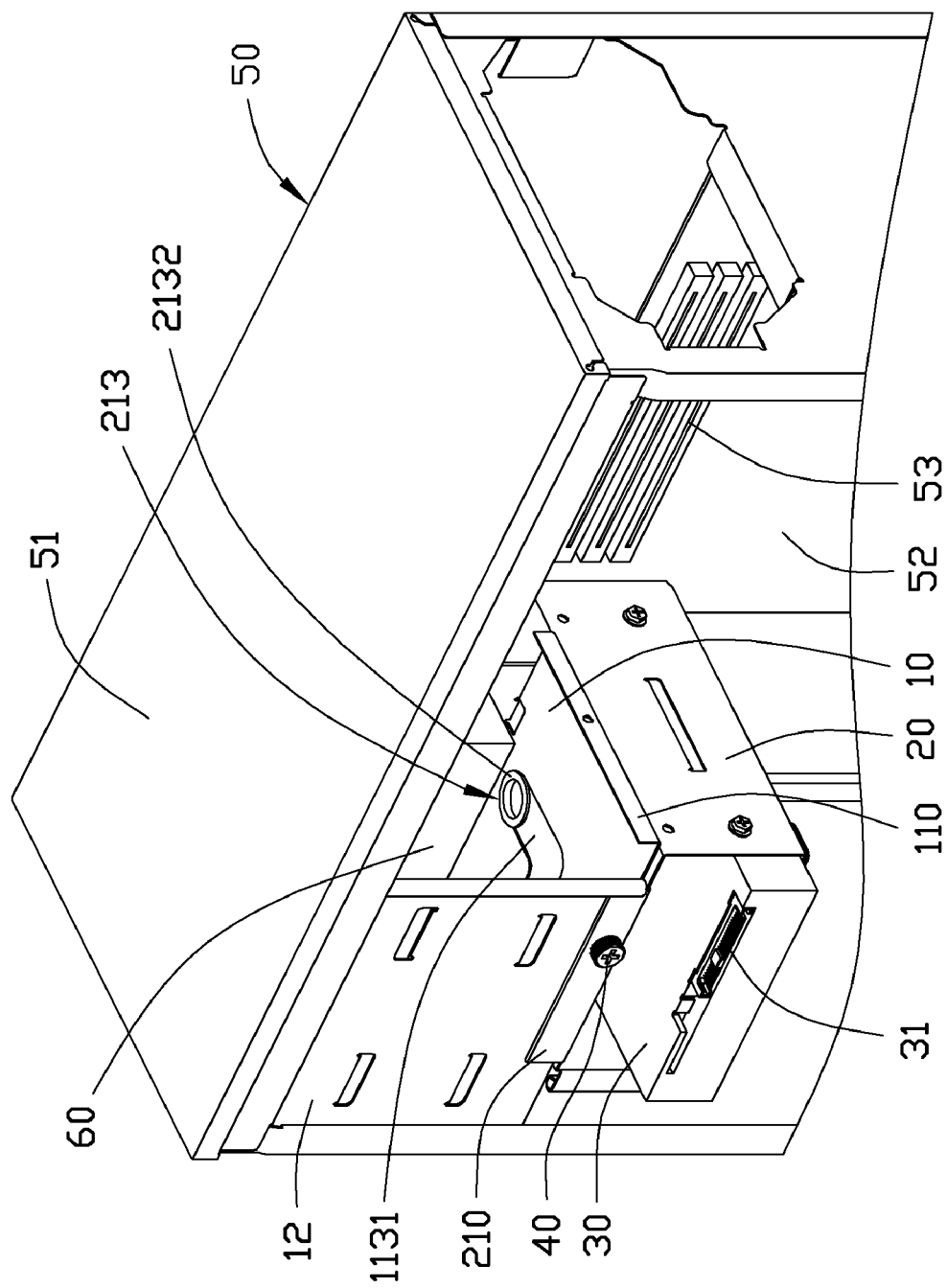
FIG. 5 is an isometric, assembled view of a computer in accordance with an exemplary embodiment of the present disclosure.

Referring to FIGS. 1 and 5, a drive mount according to an exemplary embodiment of the present disclosure includes a first mounting frame 10 connected with a second mounting frame 20. The drive mount, installed in a computer case 51 of a computer 50 receives disk drives 30, 60 therein. The first mounting frame 10 is mounted on an inner side of the computer case 51 and located above the second mounting frame 20.

Figure 2:
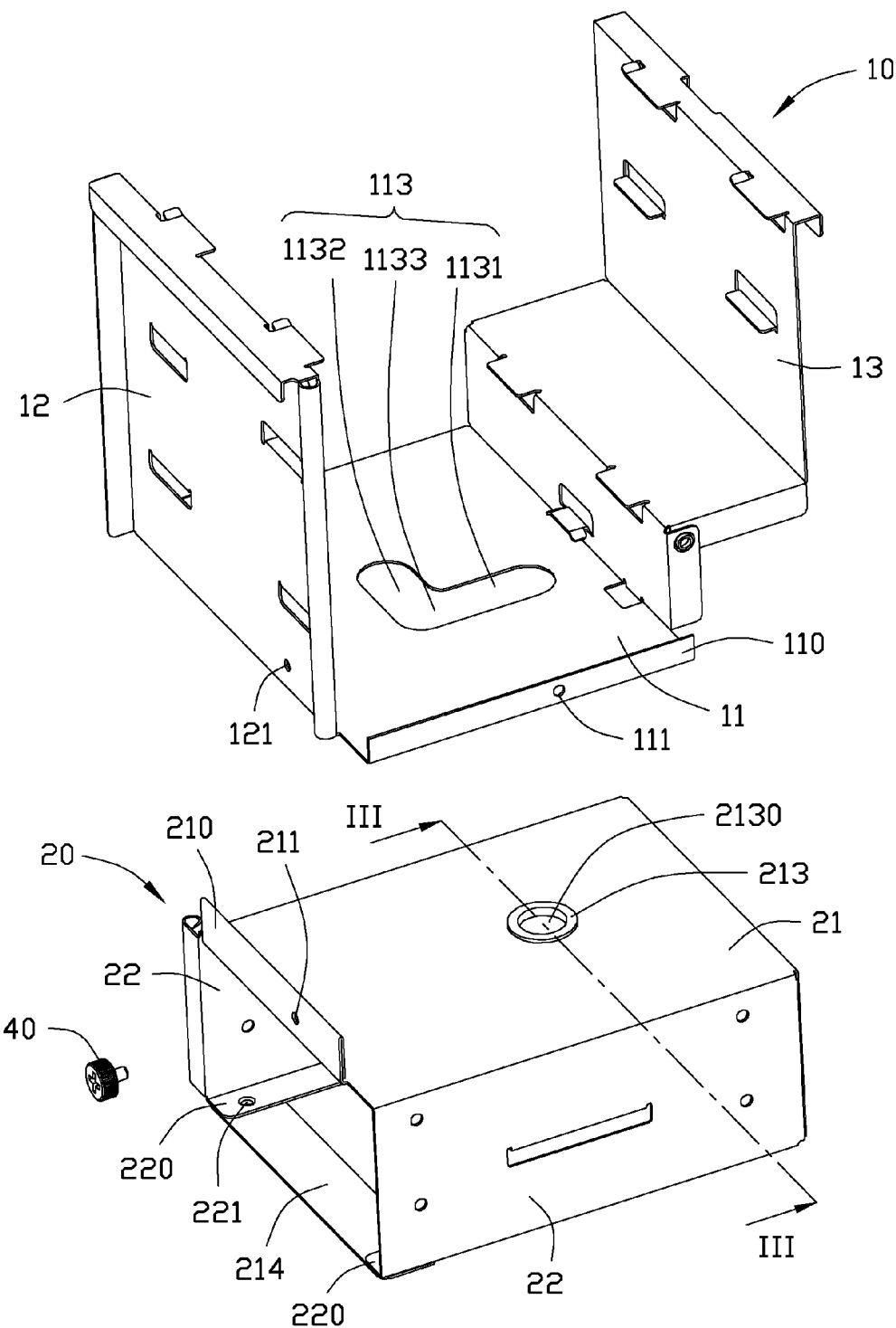
FIG. 2 is an exploded view of the drive mount of FIG. 1.

Referring to FIG. 2, the first mounting frame 10 includes a bottom plate 11, a first side plate 12 and a second side plate 13. The bottom plate 11 is substantially rectangular. The first and second side plates 12, 13 respectively extend upwardly from two opposite sides of the bottom plate 11, that is from the left and right sides of the bottom plate 11. Another side, that is a front side of the bottom plate 11, extends upwardly to form a first flange 110. The bottom plate 11 of the first mounting frame 10 defines a sliding groove 113 in a middle portion thereof. The sliding groove 113 includes a first slot 1131 and a second slot 1132. The first slot 1131 and the second slot 1132 intersect and angle from each other. In this embodiment, the first slot 1131 is perpendicular to the second slot 1132, such that the sliding groove 113 is L-shaped. An entrance port 1133 is formed between the first slot 1131 and the second slot 1132, communicating the two. A width of the first slot 1131 is equal to that of the second slot 1132 but less than that of the entrance port 1133. The first and second side plates 12, 13 are perpendicular to the first slot 1131, but parallel to the second slot 1132. The second side plate 13 is substantially stepped. A distance between the first side plate 12 and a lower portion of the second side plate 13 is less than a distance between the first side plate 12 and an upper portion of the second side plate 13. The first flange 110 is perpendicular to the second slot 1132 and defines a mounting hole 111 therein. The first side plate 12 defines a mounting hole 121 therein.

Figure 3:
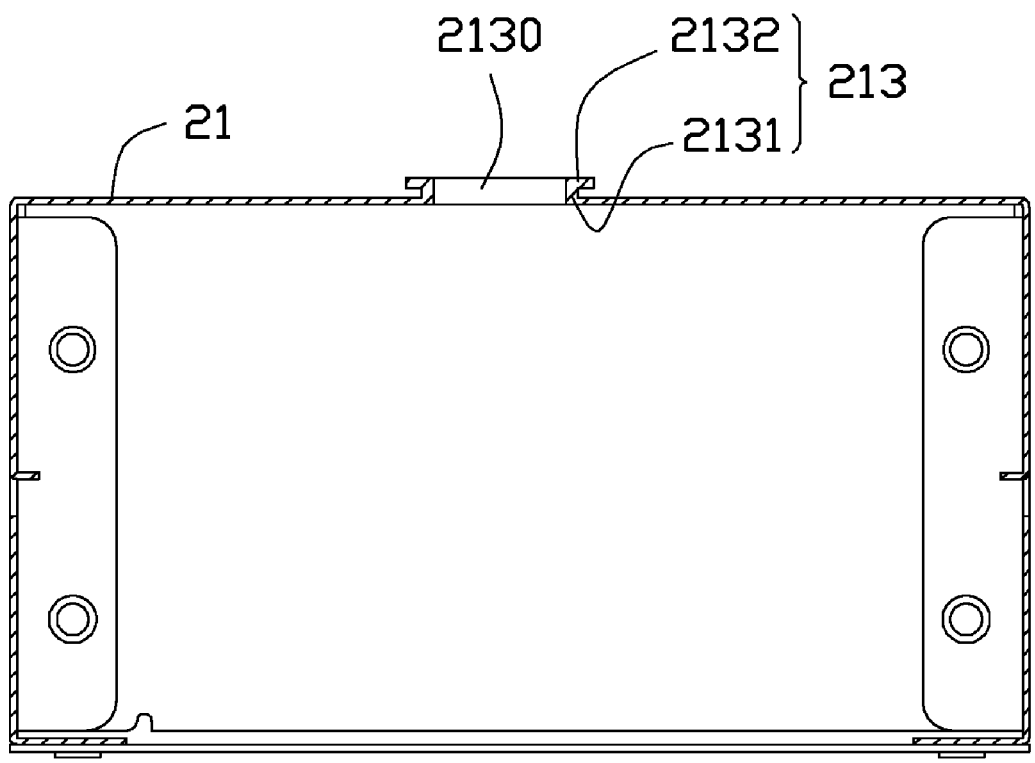
FIG. 3 is a cross section of a second mounting frame of the drive mount of FIG. 2, taken along a line thereof.
Figure 4:
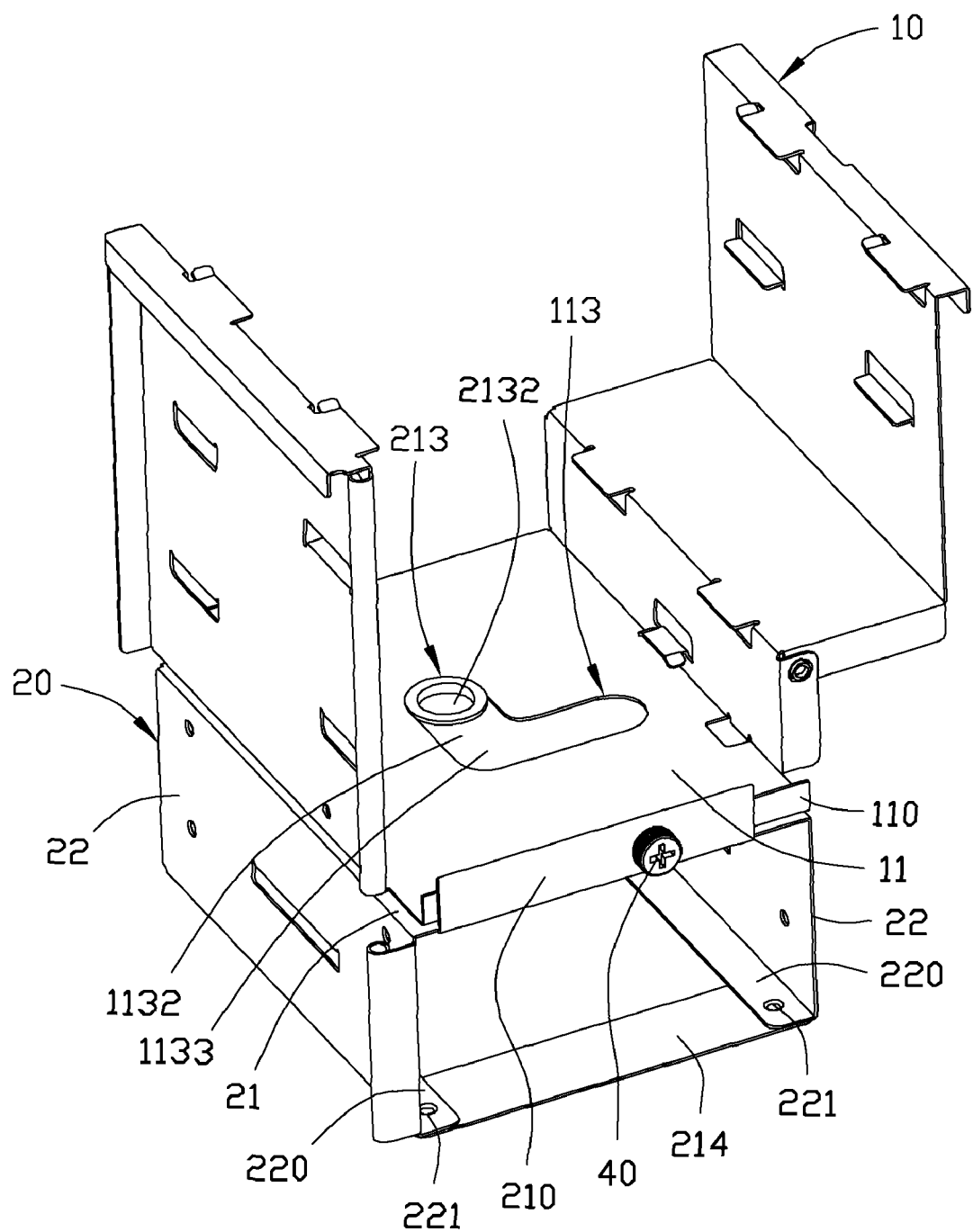
FIG. 4 is an isometric, assembled view of the drive mount of FIG. 1 in an alternative state.

The second mounting frame 20 includes a substantially rectangular top plate 21. The top plate 21 includes a latch unit 213 protruding upwardly from a middle portion thereof towards the first mounting frame 10. Referring to FIG. 3, the latch unit 213 includes a connecting tube 2131 protruding upwardly and perpendicularly from the top plate 21 of the second mounting frame 20 and a locking portion 2132 expanding outwardly from a free end of the connecting tube 2131. A through hole 2130 is defined through the locking portion 2132, the connecting tube 2131, and the top plate 21. An outer diameter of the connecting tube 2131 is equal to the width of the first and second slots 1131, 1132. A height of the connecting tube 2131 by which the connecting tube 2131 protrudes out of the top plate 21 is equal to a thickness of the bottom plate 11 of the first mounting frame 10. An outer diameter of the locking portion 2132 is equal to the width of the entrance port 1133 of the sliding groove 113. In other words, the outer diameter of the locking portion 2132 is larger than the width of the first and second slots 1131, 1132. A side of the top plate 21 extends upwardly to form a second flange 210. Two opposite sides of the top plate 21, perpendicular to the second flange 210, extend downwardly to form two mounting plates 22. The two mounting plate 22 each include a flange 220 formed at a bottom end thereof. Each of the flanges 220 extends inwardly and perpendicularly from the bottom end of a corresponding mounting plate 22 towards the other mounting plate 22. Each flange 220 defines two through holes 221 respectively at two opposite ends thereof. Two supporting flakes 214 are connected between the two flanges 220, wherein one of the supporting flakes 214 is connected between the two flanges 220 at a front side of the second mounting frame 20 and the other supporting flake 214 is connected between the two flanges 220 at a rear side of the second mounting frame 20. The flanges 220 and the supporting flakes 214 are configured for supporting the disk drive 30 (referring to FIG. 5).

Referring to FIG. 5, during assembly of the drive mount into the computer case 51, the first mounting frame 10 of the drive mount is mounted on an inner wall of the computer case 51 through the first and second side plates 12, 13. The disk drive 60, which may be a CD-ROM disk drive, is mounted on the first mounting frame 10 between the first and second side plates 12, 13. The second mounting frame 20 is disposed under the first mounting frame 10. The disk drive 30, which may be a hard disk drive, is mounted on the second mounting frame 20 between the two mounting plates 22. The latch unit 213 of the second mounting frame 20 is aligned with the entrance port 1133 of the first mounting frame 10. Then, the locking portion 2132 of the latch unit 213 extends through the entrance port 1133 and the top plate 21 of the second mounting frame 20 abuts against the bottom plate 11 of the first mounting frame 10. Thereafter, the connecting tube 2131 of the latch unit 213 can slide along the first slot 1131 of the sliding groove 113 of the first mounting frame 10 until the second flange 210 of the second mounting frame 20 abuts against the first side plate 12 of the first mounting frame 20. In this state, the locking portion 2132 of the latch unit 213 of the second mounting frame 20 engages the bottom plate 11 of the first mounting frame 20 near edges of the first slot 1131 of the sliding groove 113, and the mounting hole 211 of the second flange 210 aligns with the mounting hole 121 of the first side plate 12 of the first mounting frame 10 for receiving a bolt 40 to thereby mount the second mounting frame 20 to the first mounting frame 10. In this state, a main board 52 of the computer 50 is mounted in the computer case 51 near the first flange 110 of the first mounting frame 10, to avoid any interference between the disk drive 30 mounted on the second mounting frame 20 and electronic components 53 mounted on the main board 52.

Alternatively, after the locking portion 2132 of the latch unit 213 extends through the entrance port 1133, the connecting tube 2131 of the latch unit 213 can slide along the second slot 1132 of the sliding groove 113 of the first mounting frame 10 until the second flange 210 of the second mounting frame 20 abuts against the first flange 110 of the first mounting frame 10. In this state, the locking portion 2132 of the latch unit 213 of the second mounting frame 20 engages the bottom plate 11 of the first mounting frame 20 near edges of the second slot 1132 of the sliding groove 113, and the mounting hole 211 of the second flange 210 of the second mounting frame 20 aligns with the mounting hole 111 of the first flange 112 of the first mounting frame 10 for receiving the bolt 40 to thereby mount the second mounting frame 20 to the first mounting frame 10. In this state, the main board 52 of the computer 50 can be mounted near the first side plate 12 of the first mounting frame 10, to avoid any interference between the disk drive 30 mounted on the second mounting frame 20 and the electronic components 53 mounted on the main board 52.

In the present disclosure, since the bottom plate 11 of the first mounting frame 10 defines a first slot 1131 and a second slot 1132, wherein the first slot 1131 and the second slot 1132 intersect and angle from each other, the latch unit 213 of the second mounting frame 20 can selectively slide along one of the first slot 1131 and the second slot 1132 to mount the second mounting frame 20 in a proper position according to a location of the main board 52, to thereby avoid interferences between the disk drive 30 mounted on the second mounting frame 20 and the electronic components 53 mounted on the main board 52. Secondly, the second mounting frame 20 is detachably connected with first mounting frame 10, which causes a installation of the disk drive 30 to the second mounting frame 20 to be very convenient, a risk of damage of the electronic components 53 of the main board 52 during installation of the disk drive 30 is also reduced. Moreover, since the second mounting frame 20 can be mounted in different positions according to the location of the main board 52, whereby a data line interface 31 of the disk drive 30 will keep away from the main board 52, which decreases an electro magnetic interference of the disk drive 30 to the electronic components 53 of the main board 52.

It is to be understood, however, that even though numerous characteristics and advantages of the present invention have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A drive mount, comprising:
a first mounting frame adapted for mounting a first disk drive thereon, the first mounting frame comprising a bottom plate, a first side plate and a second side plate respectively extend upwardly from two opposite sides of the bottom plate, and a first flange extending upwardly from another side of the bottom plate, the bottom plate defining a sliding groove therein, the sliding groove comprising a first slot, a second slot and an entrance port between the first slot and the second slot, the first slot being perpendicular to the second slot, the first side plate and the first flange each defining a mounting hole therein, the first side plate being perpendicular to the first slot, and the first flange being perpendicular to the second slot; and
a second mounting frame adapted for mounting a second disk drive thereon, the second mounting frame comprising a top plate, and a latch unit protruding from the top plate towards the first mounting frame, a side of the top plate extending upwardly to form a second flange defining a mounting hole therein, the latch unit comprising a connecting tube connected with the top plate and a locking portion expanding outwardly from a free end of the connecting tube, the locking portion of the latch unit being extendable into the entrance port of the sliding groove, the connecting tube of the latch unit being slideable along one of the first slot and the second slot of the sliding groove with the locking portion of the latch unit engaging the bottom plate of the first mounting frame beside edges of the first slot and the second slot to connect the first mounting frame and the second mounting frame together.

2. The drive mount of claim 1, wherein when the connecting tube slides along the first slot, the second flange of the second mounting frame abuts against the first side plate of the first mounting frame, and the mounting holes of the first side plate and the second flange align with each other.

3. The drive mount of claim 1, wherein when the connecting tube slides along the second slot, the second flange of the second mounting frame abuts against the first flange of the first mounting frame, and the mounting holes of the first flange and the second flange align with each other.

4. The drive mount of claim 1, wherein two opposite sides of the top plate, perpendicular to the second flange, depend downwardly to form two mounting plates.

5. The drive mount of claim 4, wherein a flange extends inwardly and perpendicularly from a bottom end of each mounting plate towards the other mounting plate, and two supporting flakes are connected between the two flanges.

6. The drive mount of claim 1, wherein an outer diameter of the connecting tube is equal to a width of each of the first slot and the second slot, a height of the connecting tube protruding out of the top plate is equal to a thickness of the bottom plate, and an outer diameter of the locking portion is larger than the width of the first slot and the second slot.

7. A drive mount, comprising:
a first mounting frame adapted for mounting a first disk drive thereon, the first mounting frame comprising a bottom plate, a first side plate and a second side plate respectively extending upwardly from two opposite sides of the bottom plate, and a first flange extending upwardly from another side of the bottom plate for securing the first mounting frame, the bottom plate defining a sliding groove therein, the sliding groove comprising a first slot, a second slot and an entrance port between the first slot and the second slot, the first slot and the second slot being angled with each other, one of the first slot and the second slot extending from the entrance port towards a direction away from the first flange, the other one of the first slot and the second slot extending from the entrance port towards a direction away from one of the first side plate and the second side plate; and a second mounting frame adapted for mounting a second disk drive thereon, the second mounting frame comprising a top plate, a latch unit protruding from the top plate towards the first mounting frame, a side of the top plate extending upwardly to form a second flange, the second flange cooperating with the first flange or the one of the first side plate and the second side plate to mount the second mounting frame on the first mounting frame, the latch unit comprising a connecting tube connected with the top plate and a locking portion expanding outwardly from a free end of the connecting tube, the locking portion of the latch unit being extendable into the entrance port of the sliding groove, the connecting tube of the latch unit being slideable along one of the first slot and the second slot of the sliding groove with the locking portion of the latch unit engaging the bottom plate of the first mounting frame beside edges of the first slot and the second slot to connect the first mounting frame and the second mounting frame together.

8. The drive mount of claim 7, wherein the first slot is perpendicular to the first side plate and extends from the entrance port towards a direction away from the first side plate, and the second slot is perpendicular to the first flange.

9. The drive mount of claim 8, wherein the first slot is perpendicular to the second slot.

10. The drive mount of claim 8, wherein the first side plate, the first flange and the second flange each define a mounting hole therein; when the locking portion of the latch unit engages the bottom plate of the first mounting frame near edges of the first slot, the mounting hole of the second flange aligns with the mounting hole of the first side plate for receiving a bolt to thereby mount the second mounting frame to the first mounting frame; and when the locking portion of the latch unit engages the bottom plate of the first mounting frame near edges of the second slot, the mounting hole of the second flange aligns with the mounting hole of the first flange for receiving a bolt to thereby mount the second mounting frame to the first mounting frame.

\* \* \* \* \*